United States Patent
Francescon

(10) Patent No.: US 9,098,443 B2
(45) Date of Patent: Aug. 4, 2015

(54) METHOD FOR OBTAINING INFORMATION ON THE PHASE OF A ROTATING SYSTEM BASED ON DETERMINATION OF THE FUNDAMENTAL COMPONENT OF AN INCOMING SIGNAL PROVIDED BY A SENSOR DRIVEN BY A PERIODIC MODULATION FUNCTION AND DEVICE FOR CONTROLLING A ROTATING SYSTEM

(71) Applicant: SICK STEGMANN GMBH, Donaueschingen (DE)

(72) Inventor: Massimo Francescon, Turin (IT)

(73) Assignee: SICK STEGMANN GMBH, Donaueschingen (DE)

( * ) Notice: Subject to any disclaimer, the term of this patent is extended or adjusted under 35 U.S.C. 154(b) by 325 days.

(21) Appl. No.: 13/739,079

(22) Filed: Jan. 11, 2013

(65) Prior Publication Data

US 2013/0212143 A1    Aug. 15, 2013

(30) Foreign Application Priority Data

Feb. 9, 2012 (EP) .................................. 12154606

(51) Int. Cl.
*G06F 17/14* (2006.01)
*G01D 5/24* (2006.01)
*G01D 5/241* (2006.01)

(52) U.S. Cl.
CPC ............... *G06F 17/141* (2013.01); *G01D 5/24* (2013.01); *G01D 5/2415* (2013.01)

(58) Field of Classification Search
CPC ... G06F 17/141; G06F 17/142; G06F 17/143; G06G 7/1921; G01R 23/00
USPC ........................................................ 708/405
See application file for complete search history.

(56) References Cited

U.S. PATENT DOCUMENTS

2006/0145648 A1*  7/2006  Fujita et al. ................... 318/661

FOREIGN PATENT DOCUMENTS

EP        1 538 422 B1    5/2010

OTHER PUBLICATIONS

European Search Report, Application No. EP 12 15 4606, issued Jan. 18, 2013, five (5) pages.

* cited by examiner

*Primary Examiner* — Tan V. Mai
(74) *Attorney, Agent, or Firm* — Nath, Goldberg & Meyer; Jerald L. Meyer; Leonid D. Thenor

(57) ABSTRACT

Phase information of a rotation system is obtained by a) reading the present output value Sk, (k=0, ..., N-1) of the sensor at a sequence of N points of time during a first period of a periodic modulation function (PHA,PHB,PHC, PHD), b) storing read output values Sk or a value derived from this output value at least temporarily in a memory, c) extracting information on the phase of the rotating system, wherein said information is extracted based on evaluation of a function of the type, wherein=and, and d) sampling and storing sequentially further output values Sk, k=N,N+1, ... of the sensor at corresponding points of time in the following periods of the periodic modulation function (PHA,PHB,PHC, PHD). Each reading information on the phase of the rotating system based on the function is extracted and a controller device (100) for application of this technique.

8 Claims, 2 Drawing Sheets

Figure 1:
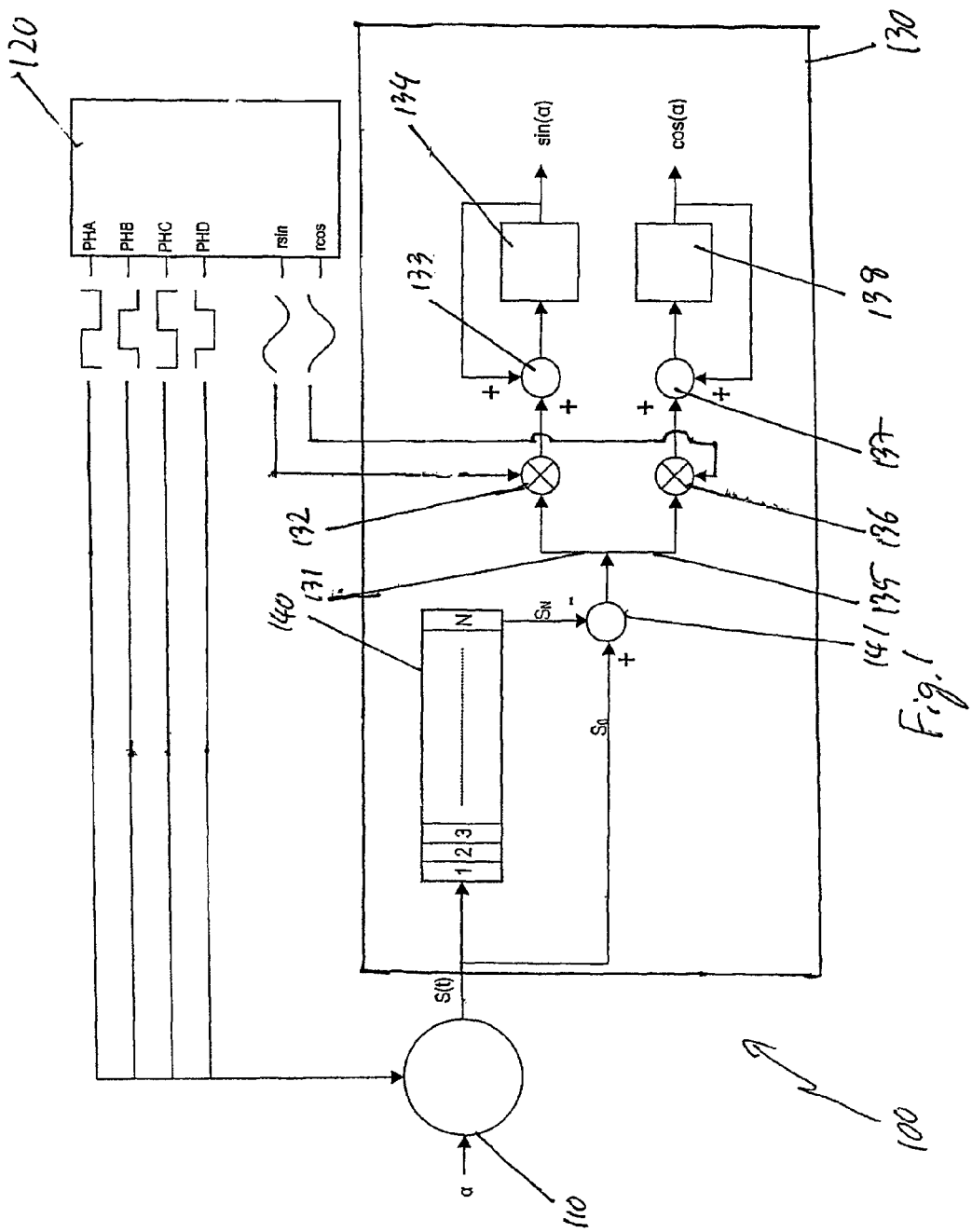

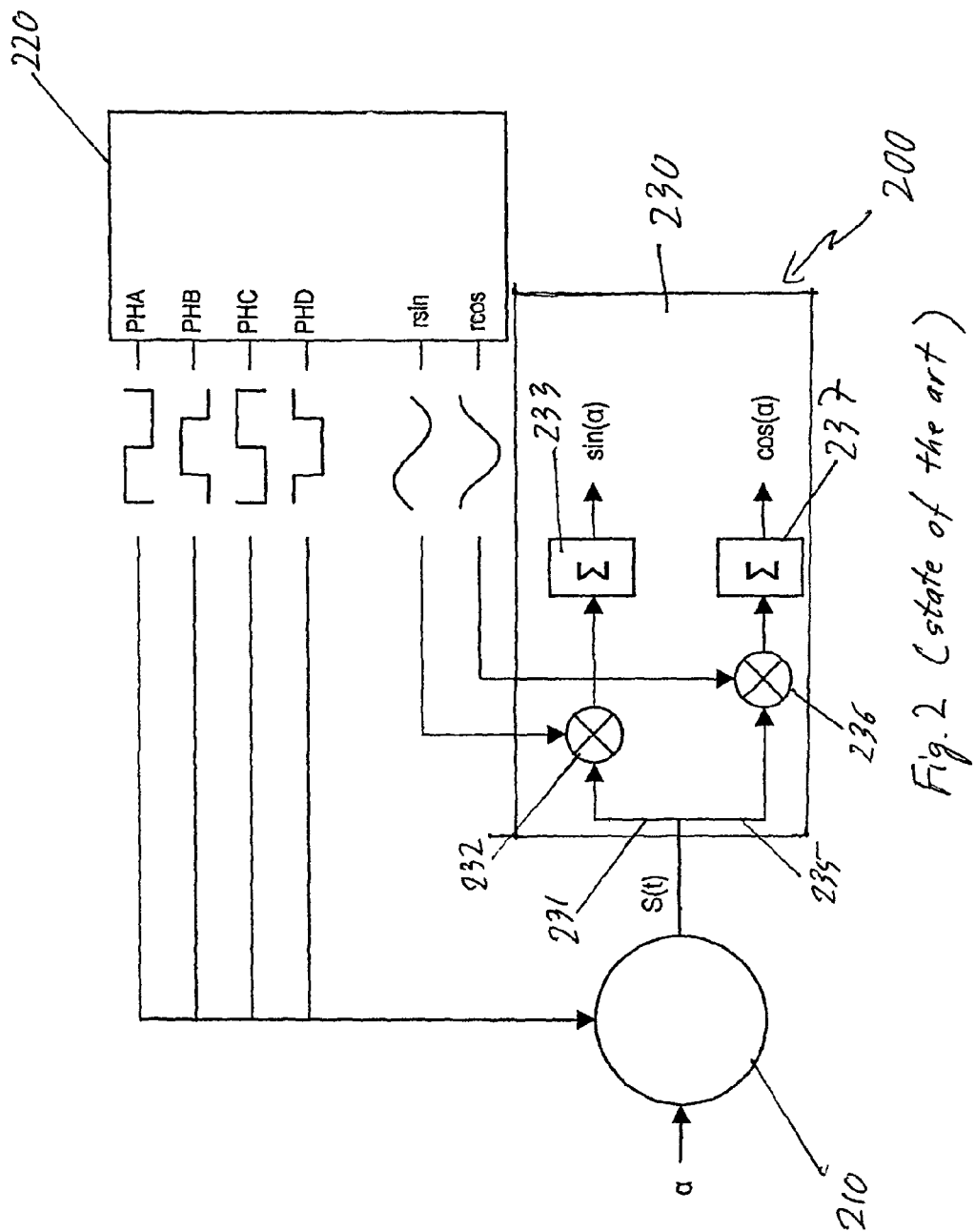
Fig. 2 (state of the art)

METHOD FOR OBTAINING INFORMATION ON THE PHASE OF A ROTATING SYSTEM BASED ON DETERMINATION OF THE FUNDAMENTAL COMPONENT OF AN INCOMING SIGNAL PROVIDED BY A SENSOR DRIVEN BY A PERIODIC MODULATION FUNCTION AND DEVICE FOR CONTROLLING A ROTATING SYSTEM

In numerous technical applications, it is important to obtain information on the phase of a rotating system at a given point of time, more specifically its angular position at said point of time. To obtain this information, one or more sensors are provided that generate data that are indicative of said phase and the data generated by the sensors are evaluated in order to obtain the desired phase information. The combination of sensors and hardware for the evaluation represents a device for controlling a rotating system. Specifically, angular encoders belong to this class of devices.

For sensor systems that are driven by a periodic modulation function, specifically for capacitive angular sensors, the well known discrete Fourier transform algorithm is a well suited method for the extraction of the phase information from the sensor data. the present output value of the sensor $S_k$, (k=0, ..., N−1) is sampled with a sampling time $T_s$ between individual samples. The complete data set of N points, covering an entire period T of the periodic modulation function, may then be subjected to a discrete Fourier transform, which leads to the time dependent function $$f(t) = \frac{1}{N}\sum_{j=0}^{N-1} S_j e^{ji\omega t} = \frac{1}{N}\sum_{n=0}^{N-1}(S_j[\cos(j\omega t) + i\sin(j\omega t)]) \quad (1)$$

with $$\omega = \frac{2\pi}{T}.$$

The time t is given by $t = k \cdot T_s$ for the $k^{th}$ sampling, where $T_s$ is the sampling time.

Based on this time dependent function, the desired phase information can be extracted according to methods known from the art, specifically by application of an arctan function on the tangens calculated from the thus obtained sine and cosine values. According to the state of the art, next another set of N sampling points is determined, f(t) is updated accordingly and evaluated.

The specific charm of this approach resides in the fact that the periodic modulation function that is used to drive the sensor system can be used as frequency and phase reference for the fundamental wave described by cos(ωt) and sin(ωt), whose harmonics are used by the discrete Fourier transform. As a short-hand notation, these sets of cosine- and sine-functions, which form the roots or root functions of a discrete Fourier transform, are referred to as r cos and r sin.

A problem of the approach described above is, however that always an entire data set of N points is required to start an extraction of the desired phase information. In other words, according to this approach angular information can only be obtained with 1/N times the sampling speed. This means that a controlling device using this approach can only act on the system with a time lag of one period of the periodic modulation function, which can lead to considerable error margins especially in systems in which the phase information based on which the system is controlled is changing rapidly.

This problem is solved by a method for obtaining information on the phase of a rotating system based on determination of the fundamental component of an incoming signal provided by a sensor driven by a periodic modulation function and a device for controlling a rotating system with the features recited in the instant claims. Advantageous embodiments of the method and the device are obtained by the features of the dependent claims.

The method for obtaining information on the phase of a rotating system based on determination of the fundamental component of an incoming signal provided by a sensor driven by a periodic modulation function according to the invention comprises the following steps:

a) sampling the present output value of the sensor $S_k$, (k=0, ..., N−1) at a sequence of N points of time during a first period of the periodic modulation function. Usually, these N points of time are separated by the identical sampling time $T_s$ given by T/N, if T is the time duration of a period of the periodic modulation function. This can be obtained, e.g., by triggering a sampling device to read the current sensor output value N-times per period of the periodic modulation function.

b) storing the sampled output values $S_k$ or corresponding values derived from the output values at least temporarily in a memory. The second alternative of the above feature is mentioned in order to clarify that the value may be stored in a modified way, e.g. multiplied with another known value, without leaving the scope of the invention.

c) extracting information on the phase of the rotating system, wherein said information is extracted based on evaluation of a function of the type $$F_k(t) = \Sigma_{j=k-N+1}^{k} S_j[f_c(N,j,t) + i f_s(N,j,t)], \quad (2)$$

wherein $$f_c(N,j,t) = \cos(((j \bmod N)-1) \cdot [\omega t + \phi(N)]) \quad (3)$$

and $$f_s(N,j,t) = \sin(((j \bmod N)-1)[\omega t + \phi(N)]) \quad (4)$$

are used.

As discussed above, $$\omega = \frac{2\pi}{T}.$$

The time t is given by $t = j \cdot T_s$ for the $j^{th}$ sampling, where $T_s$ is the sampling time.

For the sake of completeness, it is mentioned that mod represents the well known modulo function. X mod Y renders the rest of an integer division of X by Y. E.g., 10 mod 3=1, 10 mod 4=2, ...

The function $F_k(t)$ as defined above in equation (1), is closely related to the function obtained by applying a discrete Fourier transform to a sample vector $(S_{k-N}, a_{k-n+1}, ..., a_{N-1})$ and is identical to the application of a discrete Fourier transform to this sample vector if $\phi(N)=0$; therefore it is referenced as "operation of discrete Fourier transform type". The set of terms $[f_c(N,j,t) + i f_s(N,j,t)]$ are also referred to as "roots" or "root functions" of the discrete Fourier transform. Note that due to the presence of the term j mod N in the respective definitions of $f_c$ and $f_s$, there are only N different functions $f_c$ and $f_s$, respectively. The use of the terms "r cos" and "r sin" as described above is extended to the functions including the corresponding phase shift.

d) sampling and storing sequentially further output values $S_k$, k=N,N+1, . . . of the sensor at corresponding points of time in the following periods of the periodic modulation function, wherein after each reading information on the phase of the rotating system based on the function $F_k(t)$ is extracted.

This step is the key to removal of the time lag of one period, because it guarantees that after each additional reading of the sensor output value the phase information is extracted from an adapted function $F_k(t)$, where the product term involving the most recent sample $S_k$ replaces the product term involving the oldest sample contributing to $F_k(t)$.

It should be pointed out that steps a) to c) should not be interpreted in that way that necessarily the N values need to be read immediately after each other, before any step according to b) or c) may be performed. The actions mentioned in step a are, however, necessary to obtain a first meaningful extraction of information on the phase of the rotating system. Specifically, it is e.g. also possible to realize steps a) to c) by repeating N-times the sequence of reading a sensor value, saving the sensor value and performing operations for the extraction of information on the phase of the rotating system, which will lead to N−1 unreliable values for phase information based on an incomplete set of sensor data.

In a preferred embodiment of the method, the sum of the cosine terms and the sum of the sine terms are saved after each evaluation of $F_k(t)$ in such a way that these values are available for use in the evaluation of $F_{k+1}(t)$ $F_{k-1}(t)$ is evaluated by adding the term $(S_k-S_{k-N})f_c(N,k,t)$ to the sum of the cosine terms and by adding the term $(S_k-S_{k-N})f_s(N,k,t)$ to the sum of the sine terms. This can be expresses mathematically, using $A_c$ as variable for the sum of cosine terms and $A_s$ as variable for the sum of sine terms as $$A_c(k,N)=\Sigma_{j=k-N+1}^{k} S_j f_c(N,j,t) \quad (5)$$

$$A_s(k,N)=\Sigma_{j=k-N+1}^{k} S_j f_s(N,j,t) \quad (6)$$

The evaluation of the corresponding terms $A_c(k+1, N)$, $A_s(k+1, N)$ may then be performed by executing the simple operations $$A_c(k+1,N)=A_c(k,N)+(S_k-S_{k-N})f_c(N,k,t) \quad (7)$$

and $$A_s(k+1,N)=A_s(k,N)+(S_k-S_{k-N})f_s(N,k,t) \quad (8)$$

because due to the definition of $f_c$ and $f_s$ as described above in equations (3) and (4), $f_c(N,k,t)=f_c(N,k-N,t)$ and $f_s(N,k,t)=f_s(N,k-N,t)$.

It should be pointed out that this type of "saving" does not necessarily involve a memory, but can also be realized by means of a sample hold or a time delayed feedback loop.

The advantage of this embodiment is that the number of calculations needed in order to obtain the correct result is drastically reduced.

In another preferred embodiment of the invention, the memory is operated according to a LILO (last in last out) principle, so that the determined output values of the sensor form a samples queue and $$\phi(N) = \frac{2\pi}{N}$$

wherein for the p-th evaluation that is pe
The application of the LILO principle to the memory management is advantageous, because it allows for very convenient hardware-based realization for the memory, specifically the use of a simple shift-register of length N or N+1. In this situation, the product terms of the sum in formula (1) or (2), respectively, can simply be realized by providing a multiplier circuit, whose input signals are the (potentially D/A-converted) content of a given register cell and the corresponding sine or cosine function that can conveniently be provided by the internal generator that is present to generate the periodic modulation function anyway.

However, as discussed in more detail below, the replacement of a first read output value of the sensor by the corresponding output value that was read one modulation period of the sensor later than the first read output value in the "standard" discrete Fourier transform with $\phi(N)=0$ requires that each data entry that contributes to the sum in formula (1) or (2), respectively, multiplication of a given data entry with the same root for all calculations that are performed. This can be obtained for a data entry that is shifted through a shift register by using "rolling functions" as defined above in the reference function.

A very advantageous technical realization for execution of the method is obtainable, when a signal corresponding to the sum of most recently sampled value $S_k$ and the negative of the oldest entry $S_{k-N}$ of a samples queue of length N is formed before the value $S_k$ is entered into the samples queue and the oldest entry $S_{k-N}$ of the samples queue is removed. The thus formed signal is provided to two further processing branches for calculating the cosine-terms $A_c$ of $F_k(t)$ and the sine-terms $A_s$ of $F_k(t)$, respectively, by multiplication with the functions $f_c(N,k,t)$ and $f_s(N,k,t)$, thus providing a product signal in each of the two further processing branches for calculating the cosine-terms of $F_k(t)$ and the sine-terms of $F_k(t)$, respectively. Subsequently, in each processing branch a sum signal is formed by an adding device by a single addition of said product signal and a previous sum signal that is fed back in a time-delayed way to the adding device.

The controller device for obtaining information on the phase of a rotating system according to the invention comprises a sensor that is driven by a periodically modulated signal, so that the periodically modulated signal causes the sensor to provide an output value that is dependent on position and/or orientation of the rotating system, an internal signal generator for providing a periodic modulation function to be used as the periodically modulated signal for said sensor and for providing reference sine functions and reference cosine functions required for performing an operation of discrete Fourier transform type, a memory device for saving output values of the sensor signal, at least one multiplication device for multiplication of an output value of the sensor signal with a reference sine function and/or a reference cosine function and at least a first adding device for adding output from the at least one multiplication device to a sum, wherein the controller device is adapted to perform the operation of discrete Fourier transform type N-times during a period of the periodic modulation function.

According to an advantageous embodiment of the controller device, the memory for saving output values of the sensor signal is adapted to be operated according to the LILO principle and comprises a samples queue and the controller device comprises a second adding device for adding the most recent output value and the inverted oldest output value contained in the samples queue and a delaying device for delaying at least the output of the first adding device and a feedback loop for looping the delayed output of the first adding device back to the first adding device. This allows for a fast, hardware-based solution for the evaluation of a function of the discrete Fourier transform type.

A very simple hardware solution which allows for a fast feedback from the encoder device is obtained if the samples queue is arranged to comprise the last N read sensor values in the order in which they have been obtained.

Further, the controller comprises a second adding device at whose inputs the signal corresponding to a further read sensor value that is not yet included in the samples queue and the inverted signal corresponding to the oldest read sensor value from the samples queue is provided.

Still further, the sum obtained from the second adding device is provided to a sine branch comprising a first multiplication device, the first adding device and a first time delaying device, wherein in said sine branch the sum provided by the second adding device is multiplied with a sine reference function provided by the internal signal generator to obtain a product, to be added to the time-delayed output of the first adding device and the sum obtained from the second adding device is provided to a cosine branch comprising a second multiplication device, a third adding device and a second time delaying device, wherein the sum provided by the second adding device is multiplied with a cosine reference function provided by the internal signal generator to obtain a product to be added to the time-delayed output of the first adding device.

In other words, the hardware components needed specifically for the extraction of the phase information in this setup are just three adding devices, two multiplication devices, two time delay devices and a memory device that is operated as samples queue according to the LILO principle, which can be realized as a simple shift register of length N. In addition, the root functions required for a discrete Fourier-transform type operation must be provided at the respective multiplication devices, but as an internal signal generator is available anyway in order to operate the periodically modulated sensor, this requirement is met anyway and does not lead to additional cost.

Next, the invention is explained in more detail using a figure of an embodiment of the invention and a figure illustrating the state of the art. The figures show FIG. 1: a schematic block diagram of an embodiment of a controller device according to the invention, and FIG. 2: a schematic block diagram of an embodiment of a controller device according to the state of the art.

Relating first to the controller device 200 according to the state of the art displayed in FIG. 2, the controller device 200 comprises a periodically modulated sensor 210 providing an output value that is dependent on position and/or orientation of the rotating system. In this specific example, the controller device is arranged for use of a capacitive rotation sensor, as described e.g. in EP 1 538 422 B1.

Furthermore, the controller device 200 comprises an internal signal generator 220 and a data processing circuit 230 for converting the output value of the periodically modulated sensor 210 into a form that allows for the extraction of phase information. The data processing circuit 230 comprises a sine branch 231 and a cosine branch 235. Both sine branch 231 and cosine branch 235 comprise a multiplication device 232, 236 and a summation device 233,237.

During operation, the periodically modulated sensor 210 receives an input α representing the position and/or orientation of a rotating system and is periodically modulated by periodic modulation functions PHA,PHB,PHC,PHD that are represented in FIG. 2 by display of one period of the function, provided by the internal signal generator 220. In response to these input signals, the periodically modulated sensor 210 provides a modulated output signal S(t), which is then processed by the data processing circuit 230.

For processing, the modulated output signal S(t) is provided to both the sine branch 231 and the cosine branch 235 of the data processing circuit 230. More specifically, it is provided as input signal for the multiplication devices 232 and 236, respectively. The purpose of multiplication device 232 is to multiply the current modulated output signal S(t) with the corresponding r sin function in order to provide one of the product terms for the discrete Fourier transform that is described by formula (2) when $\phi(N)=0$ as output. Correspondingly, the purpose of multiplication device 236 is to multiply the current modulated output signal S(t) with the corresponding r cos function in order to provide one of the product terms needed for performing the discrete Fourier transform as output.

In both the sine branch 231 and the cosine branch 235 the product term that is represented by the output of multiplication devices 232 and 236, respectively, is used as input for summation devices 233,237. These devices are set up in such a way that they collect N sample data as provided by the multiplication devices 232 and 236 as input and provide the sum of these N sample data as output to be used for the phase determination once N samples have been collected.

As the summation is performed only when N sample data entries are present and as the sample data entries are provided sequentially by the multiplication devices, 232 and 236, respectively, the summation devices 233, 237 save the output signal values of the periodically modulated sensor 210 in a modified form obtained by multiplication with the corresponding r sin or r cos function for a limited time. As a consequence, according to the state of the art to update the data for a single phase determination of the rotating system once in both sine branch 231 and cosine branch 235 N multiplications and N additions are required.

To enable the calculation of the product terms by multiplication devices 232 and 236, the required r sin functions are provided by the internal signal generator 220 to the second input of the multiplication device 232, and the required r cos functions are provided by the internal signal generator 220 to the second input of the multiplication device 236.

As can be seen directly when looking at formula (2), the r sin and r cos functions that have to be provided to the multiplication devices 232 and 235, respectively, vary as a function of the sample value $S_k$ that is currently processed. Furthermore, N sampled values should be distributed equally over a modulation period of the periodic modulation functions PHA,PHB,PHC,PHD.

Essentially, there are two ways to obtain this: If suitable periodic modulation functions are used, these can be used to provide a trigger for identifying the next sampling point and changing the r sin and r cos function that is provided by the internal signal generator. E.g. for the periodic modulation functions PHA,PHB,PHC,PHD displayed in FIG. 2, for N=4 as trigger the presence of a raising flank of the signal may be used, as there are 4 raising flanks that occur. The trigger would then cause the internal signal generator 220 to provide the next r sin and r cos functions and to store the next term of the sum in the summation device. The trigger signals may also be counted by a counter, and each time the counter reaches the value N the summation devices 233, 237 may be triggered to perform the summation and provide the result as output.

Alternatively, the internal clock of the generator may be used to cause the trigger signal at predetermined points of time.

FIG. 1 shows a schematic block diagram of an embodiment of a controller device 100 according to the invention. The controller device 100 comprises a periodically modulated sensor 110 providing an output value that is dependent on position and/or orientation of the rotating system. In this specific example, the controller device is arranged for use of a capacitive rotation sensor, as described e.g. in EP 1 538 422 B1.

Furthermore, the periodically modulated sensor 110 comprises an internal signal generator 120 and a data processing circuit 130 for converting the output value of the periodically modulated sensor 110 into a form that allows for the extraction of phase information.

The key difference between the controller device 200 and the controller device 100 resides in the structure of the data processing circuit 130, whereas periodically modulated sensors 110 and 210 and the signal generators 120 and 220 are configured and operated essentially in the same way.

In the data processing circuit 130, the output signal of the periodically modulated sensor 110, which is obtained in the same way as described above, is not provided to sine branch 131 and the cosine branch 135 directly, but only after preprocessing by an adding device 141.

The inputs for the adding device 141 are the output value S(t) as obtained from the periodically modulated sensor 130 and the inverted (i.e. negative) of the oldest entry of samples queue 140. Samples queue 140 is a specific type of memory operating according to the LILO principle and may preferably be realized as a shift register of length N.

The output of adding device 141 is then provided as input to a sine branch 131 and a cosine branch 135 of the data processing circuit 130. Both sine branch 131 and cosine branch 135 comprise a multiplication device 132,136, an adding device 133,137 and a time delay device 134,138.

More specifically, the output of adding device 141 is provided as input signal for the multiplication devices 132 and 136, respectively. The purpose of multiplication device 132 is to multiply the current output of adding device 141 with the corresponding r sin function in order to provide one of the product terms for the discrete Fourier transform type operation that is described by formula (2). Correspondingly, the purpose of multiplication device 136 is to multiply the current output of adding device 141 with the corresponding r cos function in order to provide one of the product terms needed for performing the discrete Fourier transform type operation as output.

In both the sine branch 131 and the cosine branch 135 the product term that is represented by the output of multiplication devices 132 and 136, respectively, is used as input for the adding devices 133,137. In contrast to the more complex summation devices 233,237 according to the state of the art, adding devices 133,137 provide an output corresponding to the sum of the signals provided at their respective inputs. This output is used as input for time delay devices 134,138, whose output is not only be used for the phase determination, but also by means of a feedback loop as second input for the adding devices 133,137.

The effect of the use of the feedback from the time delay devices 134,138 is that in the respective adding devices 133, 137 the previously obtained result of the last discrete Fourier transform type operation can be updated after each sampling, i.e. N times per period of the periodic modulation function, by a single addition and a single multiplication in the sine branch 131 and the cosine branch 135, respectively. In order to achieve this, it is necessary to use the difference between the current output value of the periodically modulated sensor 110 and the corresponding value from the previous modulation period, saved in the samples queue 140. This difference is obtained provided by adding device 141.

For the same reasons as the controller device 200, controller device 100 may use a triggered operation. In addition, the triggers that may be obtained in the same way as described above in the context of controller device 200 can be used to cause the update of the samples queue 140 in controller device 100, i.e. to initiate the shift of the data saved therein to the next place of the queue, overwriting the oldest sample in the last slot of the samples queue 140 and saving the most recent sensor output value in the first slot of the samples queue.

It should be stressed that the invention as described above is not limited to a hardware-based data processing as described above but can easily be realized by software-based processing, in which the corresponding operations are performed by a CPU.

REFERENCE NUMERALS 100,200 controller device
110,210 periodically modulated sensor
120,220 internal signal generator
130,230 data processing circuit
131,231 sine branch
132,232 multiplication device
133 first adding device
134,138 time delay device
135,235 cosine branch
136,236 multiplication device
137 third adding device
140 samples queue
141 second adding device
233,237 summation device
PHA,PHB,PHC,PHD periodic modulation function
r sin reference sine functions
r cos reference cosine functions
S(t) modulated output signal
α input from rotating system

The invention claimed is:

1. Method for obtaining information on the phase of a rotating system using a controller device, said method comprising the steps of
generating a periodic modulation function (PHA, PHB, PHC, PHD) using an internal signal generator of the controller device,
generating, using the internal signal generator, reference sine functions (r sin) and reference cosine functions (r cos) required for performing discrete Fourier transform operation,
driving a periodically modulated sensor of the controller device with the periodically modulated signal, so as to cause the sensor to provide an output signal (S(t)) that is dependent on position and/or orientation of the rotating system,
reading a present output value $S_k$, (k=0, ..., N−1) of the sensor at a sequence of N points of time during a first period of the periodic modulation function (PHA, PHB, PHC, PHD), and
storing the output values $S_k$ or a value derived from this output value at least temporarily in a memory of the controller device,
wherein the controller device is configured to:
extract information on the phase of the rotating system, wherein said information is extracted based on evaluation of a function of the type $$F_k(t) = \Sigma_{j=k-N+1}^{k} S_j [f_c(N,j,t) + i f_s(N,j,t)],$$

wherein $$f_c(N,j,t) = \cos(((j \bmod N)-1) \cdot [\omega t + \phi(N)])$$

and $$f_s(N,j,t)=\sin(((j \bmod N)-1)[\omega t+\phi(N)])$$

sequentially sample and store further output values $S_k$, k=N, N+1, ... of the sensor at corresponding points of time in the following periods of the periodic modulation function (PHA, PHB, PHC, PHD), and extract information on the phase of the rotating system based on the function $F_k(t)$.

2. Method according to claim 1, wherein the sum of the cosine terms and the sum of the sine terms are saved after each evaluation of $F_k(t)$ in such a way that these values are available for use in the evaluation of $F_{k+1}(t)$ $F_{k+1}(t)$ is evaluated by adding the term $(S_k-S_{k-N})f_c(N, k, t)$ to the sum of the cosine terms and by adding the term $(S_k-S_{k-N})f_s(N, k, t)$ to the sum of the sine terms.

3. Method according to claim 1, wherein the memory is operated according to a LILO principle, so that the determined output values of the sensor form a samples queue (140) and wherein $$\Phi(N) = \frac{2\pi}{N}.$$

4. Method according to claim 1, wherein a signal corresponding to the sum of most recently sampled value $S_k$ and the negative of the oldest entry $S_{k-N}$ of a samples queue (140) of length N is formed before the value $S_k$ is entered into the samples queue (140) and the oldest entry $S_{k-N}$ of the samples queue (140) is removed, wherein the thus formed signal is provided to two further processing branches (131,135) for calculating the cosine-terms of $F_k(t)$ and the sine-terms of $F_k(t)$, respectively, by multiplication with the functions $f_c(N, k,t)$ and $f_s(N, k, t)$, thus providing a product signal in each of the two further processing branches for calculating the cosine-terms of $F_k(t)$ and the sine-terms of $F_k(t)$, respectively, and wherein subsequently in each processing branch (131, 135) a sum signal is formed by an adding device (133, 137) by a single addition of said product signal and of a previous sum signal that is fed back in a time-delayed way to the adding device (133,137).

5. Method according to claim 2, wherein the memory is operated according to a LILO principle, so that the determined output values of the sensor form a samples queue (140) and wherein $$\Phi(N) = \frac{2\pi}{N}.$$

6. Controller device (100) for obtaining infomiation on the phase of a rotating system comprising a periodically modulated sensor (110) that is driven by a periodically modulated signal, so that the periodically modulated signal causes the sensor to provide an output signal (S(t)) that is dependent on position and/or orientation of the rotating system, an internal signal generator (120) for providing a periodic modulation function (PHA, PHB, PHC, PHD) to be used as the periodically modulated signal for said periodically modulated sensor (110) and for providing reference sine functions (r sin) and reference cosine functions (r cos) required for performing an operation of discrete Fourier transform type, a memory for saving output values of the sensor output signal (S(t)), at least one multiplication device (132, 136) for multiplication of an output value of the sensor signal with a reference sine function (r sin) and/or a reference cosine function (r cos) and at least a first adding device (133) for adding output from the at least one multiplication device (132, 136) to a sum, characterized in that the controller device (100) is adapted to perform the operation of discrete Fourier transform type N-times during a period of the periodic modulation function (PHA, PHB, PHC, PHD).

7. Controller device (100) according to claim 6, characterized in that the memory for saving output values of the sensor signal is adapted to be operated according to the LILO principle and comprises a samples queue (140), that the controller device (100) comprises a second adding device (141) for adding the most recent output value and the inverted oldest output value contained in the samples queue (140) and that the controller device (100) comprises a time delaying device (134, 138) for delaying at least the output of the first adding device (133) and a feedback loop for looping the delayed output of the first adding device (133) back to the first adding device (133).

8. Controller device (100) according to claim 7, characterized in that the samples queue (140) is arranged to comprise the last N read sensor values in the order in which they have been obtained, wherein the second adding device (141) at whose inputs the signal corresponding to a further read sensor value that is not yet included in the samples queue (140) and the inverted signal corresponding to the oldest read sensor value from the samples queue (140) is provided, and wherein the sum obtained from the second adding device (140) is provided to a sine branch (131) comprising a first multiplication device (132), the first adding device (133) and a first time delaying device (134), wherein in said sine branch (131) the sum provided by the second adding device (141) is multiplied with a sine reference function (r sin) provided by the internal signal generator (120) to obtain a product to be added to the time-delayed output of the first adding device (133)

and wherein the sum obtained from the second adding device (141) is provided to a cosine branch (135) comprising a second multiplication device (136), a third adding device (137) and a second time delaying device (138), wherein the sum provided by the second adding device (141) is multiplied with a cosine reference function (r cos) provided by the internal signal generator (120) to obtain a product to be added to the time-delayed output of the first adding device (133).

* * * * *